United States Patent
Hoshina et al.

(10) Patent No.: US 12,500,396 B2
(45) Date of Patent: Dec. 16, 2025

(54) LASER ELEMENT

(71) Applicant: SONY GROUP CORPORATION, Tokyo (JP)

(72) Inventors: Yukio Hoshina, Kumamoto (JP); Hideki Watanabe, Kumamoto (JP)

(73) Assignee: SONY GROUP CORPORATION, Tokyo (JP)

( * ) Notice: Subject to any disclaimer, the term of this patent is extended or adjusted under 35 U.S.C. 154(b) by 665 days.

(21) Appl. No.: 17/904,805

(22) PCT Filed: Feb. 18, 2021

(86) PCT No.: PCT/JP2021/006192
§ 371 (c)(1),
(2) Date: Aug. 23, 2022

(87) PCT Pub. No.: WO2021/172171
PCT Pub. Date: Sep. 2, 2021

(65) Prior Publication Data
US 2023/0111268 A1  Apr. 13, 2023

(30) Foreign Application Priority Data
Feb. 28, 2020 (JP) .................. 2020-033671

(51) Int. Cl.
*H01S 5/34* (2006.01)
*H01S 5/20* (2006.01)
(Continued)

(52) U.S. Cl.
CPC .......... *H01S 5/3407* (2013.01); *H01S 5/2009* (2013.01); *H01S 5/32341* (2013.01);
(Continued)

(58) Field of Classification Search
CPC ... H01S 5/2009; H01S 5/3407; H01S 5/32341
See application file for complete search history.

(56) References Cited

U.S. PATENT DOCUMENTS

| 6,870,193 B2 * | 3/2005 | Takeya | B82Y 20/00 |
| | | | 257/86 |
| 2009/0141765 A1 * | 6/2009 | Kohda | H01S 5/34333 |
| | | | 372/45.012 |

(Continued)

FOREIGN PATENT DOCUMENTS

| EP | 2224503 A1 | 9/2010 |
| JP | 05-283795 A | 10/1993 |

(Continued)

OTHER PUBLICATIONS

International Search Report and Written Opinion of PCT Application No. PCT/JP2021/006192, issued on Apr. 13, 2021, 10 pages of ISRWO.

*Primary Examiner* — Michael Carter
(74) *Attorney, Agent, or Firm* — CHIP LAW GROUP

(57) ABSTRACT

Provided is a laser element that includes a first semiconductor layer, a second semiconductor layer, an active layer, and an electron barrier layer. The first semiconductor layer includes a group iii nitride semiconductor having a first conductive type. The second semiconductor layer includes a group iii nitride semiconductor having a second conductive type. The electron barrier layer is between the active layer and the second semiconductor layer and includes a group iii nitride semiconductor having a composition ratio of Al larger than that of the second semiconductor layer. The electron barrier layer has a recessed and projecting shape on a surface of the electron barrier layer. The recessed and projecting shape has a height difference, between a projecting portion and a recessed portion in a direction perpendicular to a layer surface direction, that is 2 nm or more and less than 10 nm.

4 Claims, 3 Drawing Sheets

(51) Int. Cl.
  *H01S 5/323* (2006.01)
  *H01S 5/343* (2006.01)

(52) U.S. Cl.
  CPC ...... *H01S 5/34333* (2013.01); *H01S 5/34346* (2013.01); *H01S 5/20* (2013.01)

(56) References Cited

U.S. PATENT DOCUMENTS

2012/0269222 A1* 10/2012 Kyono ................... B82Y 20/00
                                                  372/45.011
2014/0138726 A1*  5/2014 Yamane ................. H10H 20/82
                                                      257/98

FOREIGN PATENT DOCUMENTS

| JP | 2002217116 A | 8/2002 |
| JP | 2006-165519 A | 6/2006 |
| JP | 2007214380 A | 8/2007 |
| JP | 2012-156508 A | 8/2012 |
| JP | 2012-227492 A | 11/2012 |
| JP | 2014-103211 A | 6/2014 |
| JP | 2017-034036 A | 2/2017 |

* cited by examiner

LASER ELEMENT

CROSS REFERENCE TO RELATED APPLICATIONS

This application is a U.S. National Phase of International Patent Application No. PCT/JP2021/006192 filed on Feb. 18, 2021, which claims priority benefit of Japanese Patent Application No. JP 2020-033671 filed in the Japan Patent Office on Feb. 28, 2020. Each of the above-referenced applications is hereby incorporated herein by reference in its entirety.

TECHNICAL FIELD

The present technology relates to a laser element that includes an electron barrier layer.

BACKGROUND ART

A pure blue semiconductor laser using a nitride compound semiconductor has been developed for applications such as blue to green light-emitting diodes (LEDs) for general lighting, a laser display, and an in-vehicle headlight light source. In this semiconductor laser, an AlInGaN quantum well layer is generally used for an active layer and it is possible to emit light of a blue band by increasing the In composition ratio in the active layer.

In the nitrogen compound semiconductor, it is common to provide an electron barrier layer formed of p-type AlGaN in order to suppress electron overflow from the active layer. The electron overflow is a phenomenon in which electrons supplied from the n-side do not emit light in the quantum well layer and are conducted to the p-side, and causes a decrease in light emission efficiency and a deterioration in temperature characteristics as the characteristics of the laser.

For example, Patent Literature 1 discloses a semiconductor laser element in which an electron barrier layer formed of AlGaN having a sufficiently large bandgap energy as compared with the quantum well layer is provided on the side closest to the quantum well layer in the p-type layer in order to suppress electron overflow.

CITATION LIST

Patent Literature

Patent Literature 1: Japanese Patent Application Laid-open No. 2006-165519

DISCLOSURE OF INVENTION

Technical Problem

However, although the above-mentioned electron barrier layer needs p-type doping with high concentration so as not to cause voltage deterioration, a threshold current is deteriorated by the optical loss of dopants with high concentration in this layer. In particular, in the pure blue semiconductor laser, the deterioration of the threshold current with respect to the amount of optical loss is remarkable, which is a big problem. Further, if the doping concentration is reduced in order to reduce the optical loss, the voltage deteriorates and a sufficient barrier effect cannot be achieved.

Further, by providing the electron barrier layer, high stress is generated due to lattice strain. For this reason, when a mechanical force is applied at the time of laser cleavage, unintended minute faults occur in the vicinity of the active layer, which affect the laser characteristics and cause deterioration of the yield during production.

In view of the circumstances as described above, it is an object of the present technology to provide a laser element capable of preventing laser characteristics from deteriorating while suppressing electron overflow and improving the yield at the time of production.

Solution to Problem

In order to achieve the above-mentioned object, a laser element according to an embodiment of the present technology includes: a first semiconductor layer; a second semiconductor layer; an active layer; and an electron barrier layer.

The first semiconductor layer is formed of a group iii nitride semiconductor having a first conducive type.

The second semiconductor layer is formed of a group iii nitride semiconductor having a second conductive type.

The active layer is formed of a group iii nitride semiconductor and is provided between the first semiconductor layer and the second semiconductor layer.

The electron barrier layer is provided between the active layer and the second semiconductor layer and is formed of a group iii nitride semiconductor having a composition ratio of Al larger than that of the second semiconductor layer, a recessed and projecting shape being formed on a surface of the electron barrier layer on a side of the second semiconductor layer, the recessed and projecting shape having a height difference between a projecting portion and a recessed portion in a direction perpendicular to a layer surface direction being 2 nm or more and less than 10 nm.

In accordance with this configuration, since an electron barrier layer having a high energy level is provided between an active layer and a second semiconductor layer, it is possible to prevent electrons from flowing out to the second semiconductor layer, i.e., electron overflow. Further, by providing a recessed and projecting shape on a surface of the electron barrier layer on a side of the second semiconductor layer, it is possible to relieve the stress due to lattice strain and prevent the influence on the laser characteristics and the decrease in yield due to the electron barrier layer.

The second semiconductor layer may include a first cladding layer and a second cladding layer, and the first cladding layer may be provided between the second cladding layer and the electron barrier layer and be formed of a group iii nitride semiconductor having a composition ratio of Al larger than that of the second cladding layer and smaller than that of the electron barrier layer.

The recessed and projecting shape may have intervals between recessed portions in the layer surface direction of 15 nm or less.

The laser element may further include a guide layer that is provided between the active layer and the electron barrier layer and is formed of a group iii nitride semiconductor.

The first conducive type may be an n-type, and the second conductive type may be a p-type.

MODE(S) FOR CARRYING OUT THE INVENTION

First Embodiment

A laser element according to a first embodiment of the present technology will be described.
[Structure of Laser Element]

Figure 1:
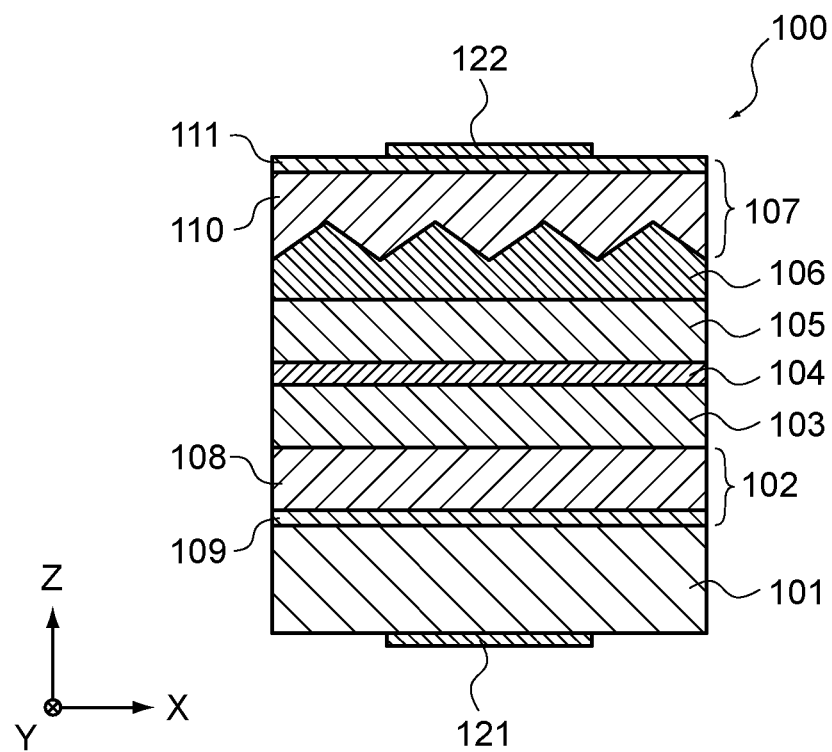
FIG. 1 is a cross-sectional view of a laser element according to a first embodiment of the present technology.

FIG. 1 is a cross-sectional view of a laser element 100 according to this embodiment. As shown in the figure, the laser element 100 includes a substrate 101, an n-type semiconductor layer 102, an n-side light guide layer 103, an active layer 104, a p-side light guide layer 105, an electron barrier layer 106, a p-type semiconductor layer 107, an n-electrode 121, and a p-electrode 122. The n-type semiconductor layer 102, the n-side light guide layer 103, the active layer 104, the p-side light guide layer 105, the electron barrier layer 106, and the p-type semiconductor layer 107 are each formed of a group iii nitride semiconductor, i.e., an AlGaN material.

The substrate 101 supports the respective layers of the laser element 100. The substrate 101 can be, for example, an n-type GaN free-standing substrate but may be formed of another material.

The n-type semiconductor layer 102 is stacked on the substrate 101 and is formed of an n-type group iii nitride semiconductor such as n-AlGaN. As shown in FIG. 1, the n-type semiconductor layer 102 may include an n-type cladding layer 108 and an n-type contact layer 109. The n-type cladding layer 108 is located on the side of the n-side light guide layer 103 and confines light and a current in the active layer 104. The n-type contact layer 109 is located on the side of the substrate 101 and improves the electrical connection between the substrate 101 and the n-type cladding layer 108. The n-type semiconductor layer 102 may include only the n-type cladding layer 108 or may include another layer in addition to the n-type cladding layer 108 and the n-type contact layer 109.

The n-side light guide layer 103 is stacked on the n-type semiconductor layer 102 and confines light generated in the active layer 104. The n-side light guide layer 103 is formed of an n-type group iii nitride semiconductor such as n-AlGaN or a neutral group iii nitride semiconductor such as i-AlGaN.

The active layer 104 is stacked on the n-side light guide layer 103 and emits light by recombination of electrons flowing in from the n-side and holes flowing in from the p-side. This light is confined in the active layer 104 by the n-side light guide layer 103 and the p-side light guide layer 105 and causes laser oscillation by stimulated emission.

The active layer 104 is formed of a group iii nitride semiconductor such as AlGaN and may have a multiple quantum well structure including a plurality of layers obtained by alternately stacking a quantum well layer having a small bandgap and a barrier layer having a large bandgap. Further, the active layer 104 may have a single-layer quantum well structure or may have another structure.

The p-side light guide layer 105 is stacked on the active layer 104 and confines light generated in the active layer 104. The p-side light guide layer 105 is formed of a p-type group iii nitride semiconductor such as p-AlGaN or a neutral group iii nitride semiconductor such as i-AlGaN.

The electron barrier layer 106 is stacked on the p-side light guide layer 105 and suppresses electron overflow. The electron overflow is a phenomenon in which electrons flowing in from the n-type do not emit light in the active layer 104 and flow out to the p-side, and the electron barrier layer 106 prevents the electrons from flowing out to the p-side by the high bandgap.

The electron barrier layer 106 is formed of a p-type group iii nitride semiconductor such as p-$Al_xGa_{1-x}N$ (X>0) and has a composition ratio of Al larger than that of the p-type semiconductor layer 107 in order to increase the bandgap. As shown in FIG. 1, a recessed and projecting shape is formed on the surface of the electron barrier layer 106 on the side of the p-type semiconductor layer 107. This recessed and projecting shape will be described below.

The p-type semiconductor layer 107 is stacked on the electron barrier layer 106 and is formed of a p-type group iii nitride semiconductor such as p-AlGaN. As shown in FIG. 1, the p-type semiconductor layer 107 may include a p-type cladding layer 110 and a p-type contact layer 111. The p-type cladding layer 110 is located on the side of the electron barrier layer 106 and confines light and a current in the active layer 104. The p-type contact layer 111 is located on the side of the p-electrode 122 and improves the electrical connection between the p-electrode 122 and the p-type cladding layer 110. The p-type semiconductor layer 107 may include only the p-type cladding layer 110 or may include another layer in addition to the p-type cladding layer 110 and the p-type contact layer 111.

The n-electrode 121 is provided on the substrate 101 and functions as an n-side electrode of the laser element 100. The n-electrode 121 is formed of an arbitrary conductive material. The p-electrode 122 is provided on the p-type semiconductor layer 107 and functions as a p-side electrode of the laser element 100. The p-electrode 122 is formed of an arbitrary conductive material.

The laser element 100 has the configuration described above. In the laser element 100, the electron barrier layer 106 is provided between the active layer 104 and the p-type semiconductor layer 107. Note that the conductive types in the laser element 100 are not limited those described above and the n-type and the p-type may be reversed. Also in this case, the electron barrier layer 106 is provided between the active layer and the p-type semiconductor layer. Further, although the respective layers of the laser element 100 excluding the substrate 101, the n-electrode 121, and the p-electrode 122 have been formed of AlGaN, they only need to be formed of a group iii nitride semiconductor and may contain a small amount of In, for example.
[Regarding Electron Barrier Layer]

Figure 2:
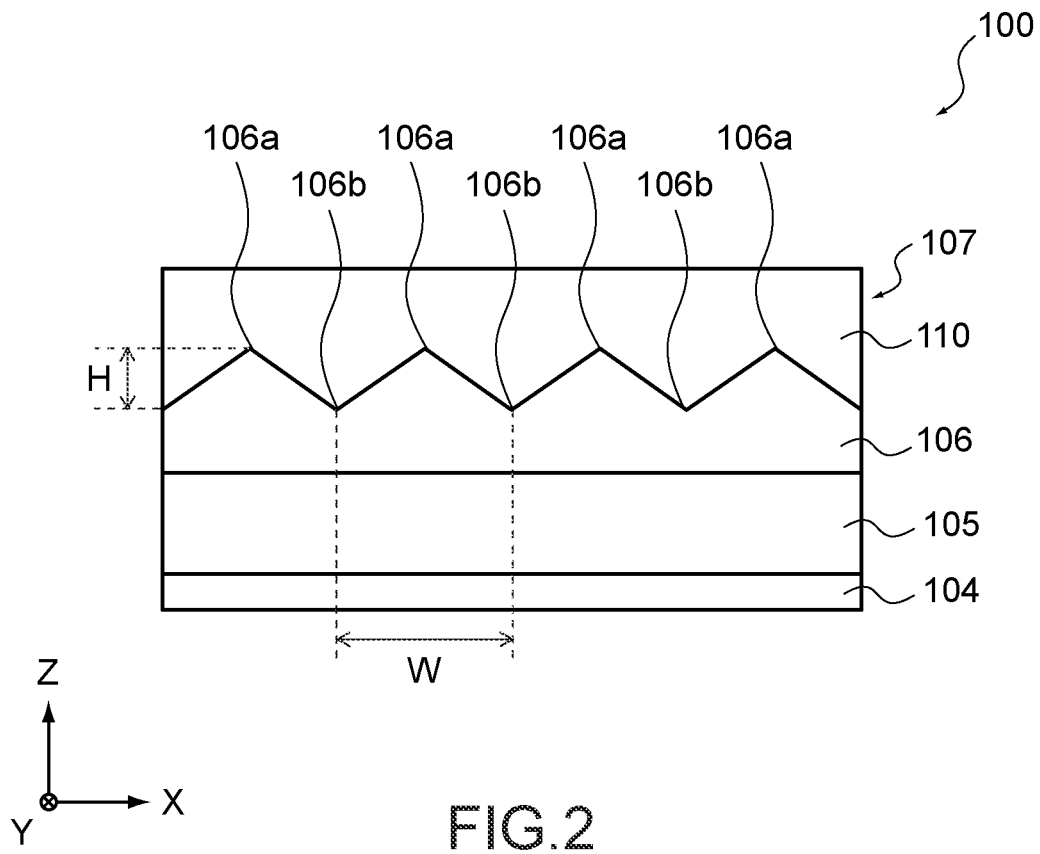
FIG. 2 is a schematic diagram showing a recessed and projecting shape of an electron barrier layer of the laser element.

The configuration of the electron barrier layer 106 will be described. FIG. 2 is a schematic diagram showing the electron barrier layer 106. As shown in the figure, a recessed and projecting shape including a plurality of projecting portions 106a and a plurality of recessed portions 106b is provided on the side of the p-type semiconductor layer 107 of the electron barrier layer 106.

When a height difference between the projecting portion 106a and the recessed portion 106b in the direction (Z direction) perpendicular to the layer surface direction of the laser element 100 is defined as a height H, the height H is suitably 2 nm or more and less than 10 nm. This is because the effect of the recessed and projecting shape cannot be achieved when the height H is less than 2 nm, and cracks occur due to the critical film thickness and the device characteristics and surface morphology deteriorate due to deterioration of crystallinity when the height H is 10 nm or more. Further, when the intervals between the recessed portions 106b in the layer surface direction (X-Y direction) are defined as a width W, the width W is suitably 15 nm or less. This is because the effect of the recessed and projecting shape cannot be achieved when the width exceeds 15 nm. Note that the respective projecting portions 106a and the respective recessed portions 106b do not need to have the same shape and may have a random shape.

Figure 3:
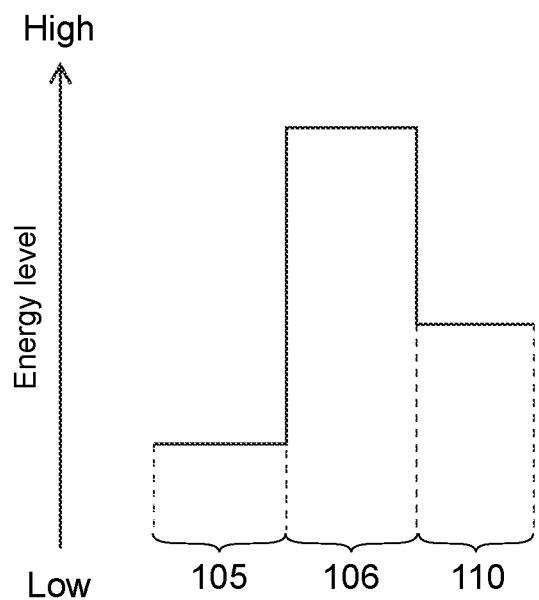
FIG. 3 is a graph showing an energy level of the laser element.

FIG. 3 is a graph showing an energy level of a conduction band in the vicinity of the electron barrier layer 106 of the laser element 100. As shown in the figure, since the electron barrier layer 106 having a high energy level is provided between the p-side light guide layer 105 and the p-type cladding layer 110, it is possible to prevent electrons from flowing out to the p-side (electron overflow).

Meanwhile, the electron barrier layer 106 needs to have a large composition ratio of Al. Generally, when an electron barrier layer having a large composition ratio of Al is provided, large stress due to lattice strain is generated at the time of production. For this reason, when a mechanical force is applied at the time of cleavage of a laser end surface, unintended minute faults occur in the vicinity of the active layer, which affect the laser characteristics and cause deterioration of the yield at the time of production.

Here, in the laser element 100, a recessed and projecting shape is provided in the electron barrier layer 106. As a result, it is possible to relieve the stress at the time of cleavage and prevent the influence on the laser characteristics and the decrease in yield due to the electron barrier layer 106.

[Regarding Method of Producing Laser Element]

The laser element 100 can be produced using MOCVD (Metal Organic Chemical Vapor Deposition). The laser element 100 can be formed by sequentially stacking the n-type semiconductor layer 102, the n-side light guide layer 103, the active layer 104, the p-side light guide layer 105, the electron barrier layer 106, and the p-type semiconductor layer 107 on the substrate 101 by MOCVD.

Here, in the MOCVD, although the respective layers are grown while flowing a raw material gas containing the material of the corresponding layer and a carrier gas for transporting the material, the supply of the raw material gas is temporarily stopped when the electron barrier layer 106 is grown. As a result, etching is generated by the carrier gas ($NH_3$, $H_2$, or the like) and a recessed and projecting shape is formed in the electron barrier layer 106.

As described above, the laser element 100 can be produced using general production equipment for a laser element. Note that the method of producing the laser element 100 is not limited that shown here, and the laser element 100 can be produced by another production method.

Second Embodiment

A laser element according to a second embodiment of the present technology will be described.

[Structure of Laser Element]

Figure 4:
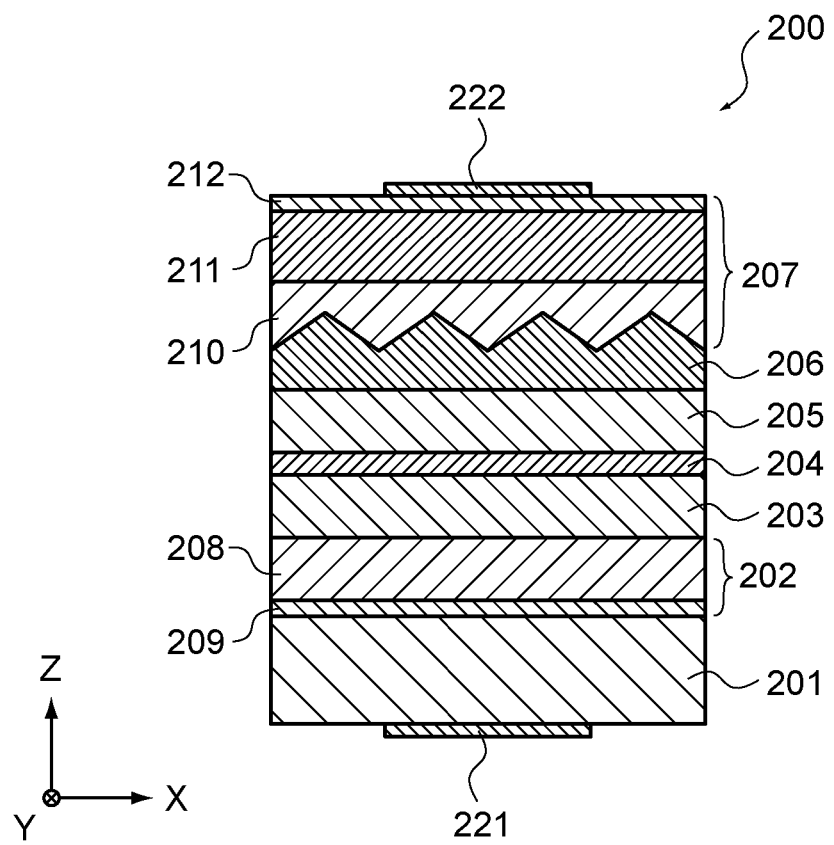
FIG. 4 is a cross-sectional view of a laser element according to a second embodiment of the present technology.

FIG. 4 is a cross-sectional view of a laser element 200 according to this embodiment. As shown in the figure, the laser element 200 includes a substrate 201, an n-type semiconductor layer 202, an n-side light guide layer 203, an active layer 204, a p-side light guide layer 205, an electron barrier layer 206, a p-type semiconductor layer 207, an n-electrode 221, and a p-electrode 222. The n-type semiconductor layer 202, the n-side light guide layer 203, the active layer 204, the p-side light guide layer 205, the electron barrier layer 206, and the p-type semiconductor layer 207 are each formed of a group iii nitride semiconductor, i.e., an AlGaN material.

The substrate 201 supports the respective layers of the laser element 200. The substrate 201 can be, for example, an n-type GaN free-standing substrate but may be formed of another material.

The n-type semiconductor layer 202 is stacked on the substrate 201 and is formed of an n-type group iii nitride semiconductor such as n-AlGaN. As shown in FIG. 4, the n-type semiconductor layer 202 may include an n-type cladding layer 208 and an n-type contact layer 209. The n-type cladding layer 208 is located on the side of the n-side light guide layer 203 and confines light and a current in the active layer 204. The n-type contact layer 209 is located on the side of the substrate 201 and improves the electrical connection between the substrate 201 and the n-type cladding layer 208. The n-type semiconductor layer 202 may include only the n-type cladding layer 208 or may include another layer in addition to the n-type cladding layer 208 and the n-type contact layer 209.

The n-side light guide layer 203 is stacked on the n-type semiconductor layer 202 and confines light generated in the active layer 204. The n-side light guide layer 203 is formed of an n-type group iii nitride semiconductor such as n-AlGaN or a neutral group iii nitride semiconductor such as i-AlGaN.

The active layer 204 is stacked on the n-side light guide layer 203 and emits light by recombination of electrons flowing in from the n-side and holes flowing in from the p-side. This light is confined in the active layer 204 by the n-side light guide layer 203 and the p-side light guide layer 205 and causes laser oscillation by stimulated emission.

The active layer 204 is formed of a group iii nitride semiconductor such as AlGaN and may have a multiple quantum well structure including a plurality of layers obtained by alternately stacking a quantum well layer having a small bandgap and a barrier layer having a large bandgap. Further, the active layer 204 may have a single-layer quantum well structure or may have another structure.

The p-side light guide layer 205 is stacked on the active layer 204 and confines light generated in the active layer 204. The p-side light guide layer 205 is formed of a p-type group iii nitride semiconductor such as p-AlGaN or a neutral group iii nitride semiconductor such as i-AlGaN.

The electron barrier layer 206 is stacked on the p-side light guide layer 205 and suppresses electron overflow. The electron barrier layer 206 is formed of a p-type group iii nitride semiconductor such as p-$Al_xGa_{1-x}N$ (X>0) and has a composition ratio of Al larger than that of the p-type semiconductor layer 207 in order to increase the bandgap. A recessed and projecting shape is formed on the surface of the electron barrier layer 206 on the side of the p-type semiconductor layer 207.

Figure 5:
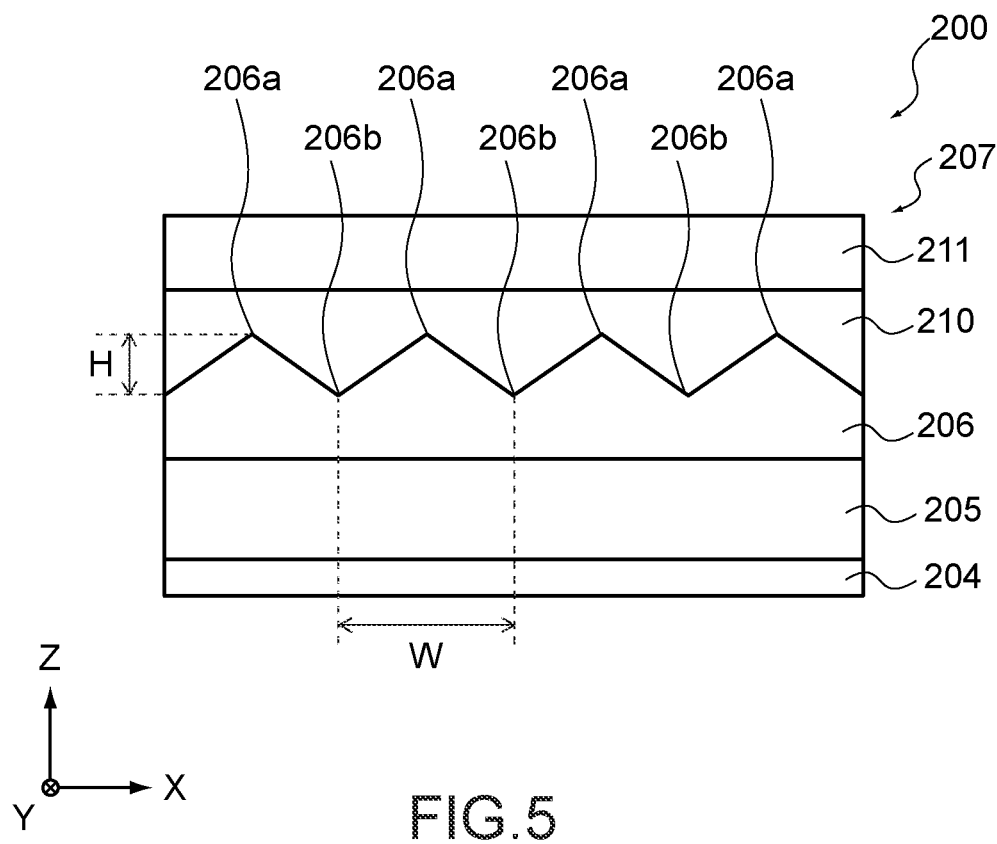
FIG. 5 is a schematic diagram showing a recessed and projecting shape of an electron barrier layer of the laser element.

FIG. 5 is a schematic diagram showing the electron barrier layer 206. As shown in the figure, a recessed and projecting shape including a plurality of projecting portions 206a and a plurality of recessed portions 206b is provided on the side of the p-type semiconductor layer 207 of the electron barrier layer 206. When a height difference between the projecting portion 206a and the recessed portion 206b in the direction (Z direction) perpendicular to the layer surface direction of the laser element 200 is defined as a height H, the height H is suitably 2 nm or more and less than 10 nm. Further, when the intervals between the recessed portions 206b in the layer surface direction (X-Y direction) are defined as a width W, the width W is suitably 15 nm or less. Note that the respective projecting portions 206a and the respective recessed portions 206b do not need to have the same shape and may have a random shape.

The p-type semiconductor layer 207 is stacked on the electron barrier layer 206 and is formed of a p-type group iii nitride semiconductor such as p-AlGaN. As shown in FIG. 4, the p-type semiconductor layer 207 may include a first p-type cladding layer 210, a second p-type cladding layer 211, and a p-type contact layer 212.

The first p-type cladding layer 210 is located on the side of the electron barrier layer 206 and confines light and a current in the active layer 204 together with the second p-type cladding layer 211. The second p-type cladding layer 211 is located between the first p-type cladding layer 210 and the p-type contact layer 212 and confines light and a current in the active layer 204 together with the first p-type cladding layer 210. The p-type contact layer 212 improves the electrical connection between the p-electrode 222 and the second p-type cladding layer 211.

Here, the first p-type cladding layer 210 is formed of a group iii nitride semiconductor having a composition ratio of Al larger than that of the second p-type cladding layer 211 and smaller than that of the electron barrier layer 206. That is, assuming that the electron barrier layer 206 is formed of p-$Al_XGa_{1-X}N$, the first p-type cladding layer 210 is formed of p-$Al_YGa_{1-Y}N$, and the second p-type cladding layer 211 is formed of p-$Al_ZGa_{1-Z}N$, the relationship of X>Y>Z is established.

The laser element 200 has the configuration described above. As described above, in the laser element 200, the electron barrier layer 206 is provided between the active layer 204 and the p-type semiconductor layer 207. Note that the conductive types in the laser element 200 are not limited those described above and the n-type and the p-type may be reversed. Also in this case, the electron barrier layer 206 is provided between the active layer and the p-type semiconductor layer. Further, although the respective layers of the laser element 200 excluding the substrate 201, the n-electrode 221, and the p-electrode 222 have been formed of AlGaN, they only need to be formed of a group iii nitride semiconductor and may contain a small amount of In, for example.

[Regarding Electron Barrier Layer and p-Type Semiconductor Layer]

As described above, in the second embodiment, the p-type semiconductor layer 207 is stacked on the electron barrier layer 206 having a recessed and projecting shape, and the p-type semiconductor layer 207 includes the first p-type cladding layer 210 and the second p-type cladding layer 211. The first p-type cladding layer 210 has a composition ratio of Al larger than that of the second cladding layer 211.

Figure 6:
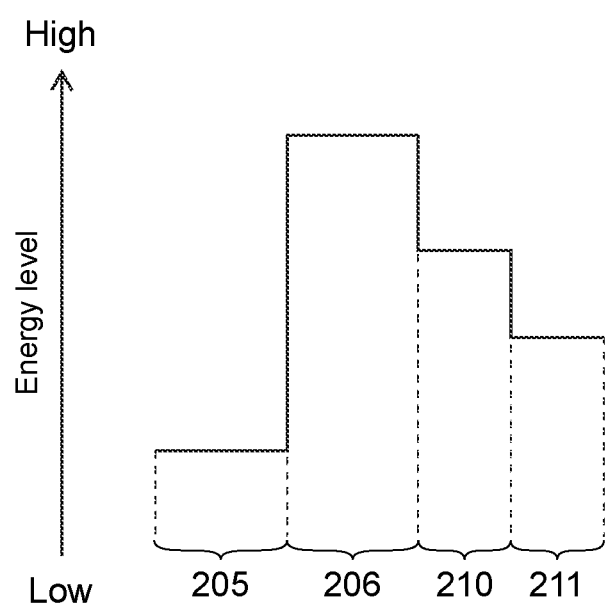
FIG. 6 is a graph showing an energy level of the laser element.

FIG. 6 is a graph showing an energy level of a conduction band in the vicinity of the electron barrier layer 206 of the laser element 200. As shown in the figure, since the electron barrier layer 206 having a high energy level is provided between the p-side light guide layer 205 and the first p-type cladding layer 210, it is possible to prevent electrons from flowing out to the p-side (electron overflow).

Meanwhile, the electron barrier layer 206 needs to have a large composition ratio of Al. Generally, when an electron barrier layer having a large composition ratio of Al is provided, large stress due to lattice strain is generated at the time of production. For this reason, when a mechanical force is applied at the time of cleavage of a laser end surface, unintended minute faults occur in the vicinity of the active layer, which affect the laser characteristics and cause deterioration of the yield at the time of production.

Here, in the laser element 200, a recessed and projecting shape is provided in the electron barrier layer 206. As a result, it is possible to relieve the stress at the time of cleavage and prevent the influence on the laser characteristics and the decrease in yield due to the electron barrier layer 206.

Further, in the laser element 200, the first p-type cladding layer 210 having a large composition ratio of Al is provided in the p-type semiconductor layer 207. As a result, it is possible to improve the internal quantum efficiency (ratio of carriers that can be injected into the active layer 204) of the laser element 200. When a recessed and projecting shape is provided in the electron barrier layer 206, holes accumulate in the recessed portion 206b and the internal quantum efficiency decreases. Here, in the case where the first p-type cladding layer 210 having a large composition ratio of Al is present in adjacent to the recessed and projecting shape, it is possible to reduce the holes to be accumulated in the recessed portion 206b and improve the internal quantum efficiency.

[Regarding Method of Producing Laser Element]

The laser element 200 can be produced using MOCVD (Metal Organic Chemical Vapor Deposition) similarly to the first embodiment. The laser element 200 can be formed by sequentially stacking the n-type semiconductor layer 202, the n-side light guide layer 203, the active layer 204, the p-side light guide layer 205, the electron barrier layer 206, and the p-type semiconductor layer 207 on the substrate 201 by MOCVD.

Here, in the MOCVD, although the respective layers are grown while flowing a raw material gas containing the material of the corresponding layer and a carrier gas for transporting the material, the supply of the raw material gas is temporarily stopped when the electron barrier layer 206 is grown. As a result, etching is generated by the carrier gas ($NH_3$, $H_2$, or the like) and a recessed and projecting shape is formed in the electron barrier layer 206.

As described above, the laser element 200 can be produced using general production equipment for a laser element. Note that the method of producing the laser element 200 is not limited that shown here, and the laser element 200 can be produced by another production method.

It should be noted that the present technology may also take the following configurations.

(1) A laser element, including:
    a first semiconductor layer that is formed of a group iii nitride semiconductor having a first conducive type;
    a second semiconductor layer that is formed of a group iii nitride semiconductor having a second conductive type;

an active layer that is formed of a group iii nitride semiconductor and is provided between the first semiconductor layer and the second semiconductor layer; and an electron barrier layer that is provided between the active layer and the second semiconductor layer and is formed of a group iii nitride semiconductor having a composition ratio of Al larger than that of the second semiconductor layer, a recessed and projecting shape being formed on a surface of the electron barrier layer on a side of the second semiconductor layer, the recessed and projecting shape having a height difference between a projecting portion and a recessed portion in a direction perpendicular to a layer surface direction being 2 nm or more and less than 10 nm.

(2) The laser element according to (1) above, in which the second semiconductor layer includes a first cladding layer and a second cladding layer, and the first cladding layer is provided between the second cladding layer and the electron barrier layer and is formed of a group iii nitride semiconductor having a composition ratio of Al larger than that of the second cladding layer and smaller than that of the electron barrier layer.

(3) The laser element according to (1) or (2) above, in which the recessed and projecting shape has intervals between recessed portions in the layer surface direction of 15 nm or less.

(4) The laser element according to any one of (1) to (3) above, further including a guide layer that is provided between the active layer and the electron barrier layer and is formed of a group iii nitride semiconductor.

(5) The laser element according to any one of (1) to (4) above, in which the first conducive type is an n-type, and
the second conductive type is a p-type.

REFERENCE SIGNS LIST 100, 200 laser element
101, 201 substrate
102, 202 n-type semiconductor layer
103, 203 n-side light guide layer
104, 204 active layer
105, 205 p-side light guide layer
106, 206 electron barrier layer
106a, 206a projecting portion
106b, 206b recessed portion
107, 207 n-type semiconductor layer
108, 208 n-type cladding layer
109, 209 n-type contact layer
110 p-type cladding layer
111, 212 p-type contact layer
210 first p-type cladding layer
211 second p-type cladding layer 121, 221 n-electrode
122, 222 p-electrode

The invention claimed is:

1. A laser element, comprising:
a first semiconductor layer that includes a group iii nitride semiconductor having a first conductive type;
a second semiconductor layer that includes the group iii nitride semiconductor having a second conductive type;
an active layer that includes the group iii nitride semiconductor, wherein the active layer is between the first semiconductor layer and the second semiconductor layer; and
an electron barrier layer between the active layer and the second semiconductor layer, wherein
the second semiconductor layer includes a first cladding layer and a second cladding layer,
the first cladding layer is between the second cladding layer and the electron barrier layer,
each of the electron barrier layer, the first cladding layer, and the second cladding layer includes the group iii nitride semiconductor that includes aluminum (Al),
the first cladding layer has a composition ratio of the Al larger than a composition ratio of the Al of the second cladding layer,
the electron barrier layer has a composition ratio of the Al larger than the composition ratio of the Al of the first cladding layer,
the electron barrier layer has a recessed and projecting shape on a surface of the electron barrier layer,
the surface of the electron barrier layer is on a side of the second semiconductor layer,
the recessed and projecting shape includes a projecting portion and a recessed portion,
in a direction perpendicular to a layer surface direction of the laser element, the recessed and projecting shape has a height difference between the projecting portion and the recessed portion, and
the height difference is 2 nm or more and less than 10 nm.

2. The laser element according to claim 1, wherein
in the layer surface direction of the laser element, the recessed and projecting shape has a plurality of intervals between a plurality of recessed portions of the recessed and projecting shape,
each interval of the plurality of intervals is 15 nm or less, and
the plurality of recessed portions includes the recessed portion.

3. The laser element according to claim 1, further comprising a guide layer between the active layer and the electron barrier layer, wherein the guide layer includes the group iii nitride semiconductor.

4. The laser element according to claim 1, wherein
the first conductive type is an n-type, and
the second conductive type is a p-type.

* * * * *